April 20, 1965

F. FRITSCH

3,178,967

EPICYCLIC SPUR GEAR TRANSMISSION

Filed Dec. 20, 1962

INVENTOR.
FELIX FRITSCH
BY
*Imrie & Smiley*
ATTYS.

April 20, 1965 F. FRITSCH 3,178,967
EPICYCLIC SPUR GEAR TRANSMISSION
Filed Dec. 20, 1962

INVENTOR.
FELIX FRITSCH

United States Patent Office 3,178,967
Patented Apr. 20, 1965

3,178,967
EPICYCLIC SPUR GEAR TRANSMISSION
Felix Fritsch, Vienna, Austria, assignor to Simmering-Graz-Pauker Aktiengesellschaft für Maschinen-, Kessel- und Waggonbau, Vienna, Austria
Filed Dec. 20, 1962, Ser. No. 246,187
Claims priority, application Austria, Dec. 22, 1961, A 9,718
3 Claims. (Cl. 74—801)

This invention relates to an epicyclic spur gear transmission which comprises a planet wheel carrier, relative to which the sun gear and the ring gear are rotatable and which carries three planet gears, which are spaced 120° apart and are mounted so as to be movable in a radial or approximately radial direction.

Such epicyclic transmissions are known, in which the planet gears are individually movable in a radial direction, e.g., by being mounted in radial slots of the planet gear carrier or on eccentric pins or in tangential links. In these known transmissions, however, a perfect balance of the loads on the various planet gears cannot be obtained because the balancing of the tooth pressures, which would be required, is not possible. In other known designs, in which it has been attempted to obtain equal forces on the three planet gears, the sun gear or the ring gear are mounted to be movable in a radial direction. In this case too the load balance is incomplete regarding the tooth pressures. Other designs are known, in which the sun gear and the ring gear are radially immovable or in which both, the sun gear and the planet gear carrier, or the planet gear carrier alone are radially movable. Whereas these designs do provide for the desired balance of forces, the double-joint couplings required within the transmission render the same complicated, heavy, and expensive.

It has also been proposed to mount the planet gears resiliently for movement in a tangential direction or in all directions. On the other hand, the use of resilient materials within a lubricant-filled transmission is undesirable. Besides, the desired load balance cannot be perfectly obtained because even relatively small geometric inaccuracies will result in a different resilient behaviour.

Finally, epicyclic transmissions are known in which the planet gears are individually mounted for tangential movement, e.g., in tangential or concentric circular slots of the planet gear carrier or on eccentric pins. When the planet gears are mounted in slots, it is undesirable that the peripheral forces are not transmitted directly to the planet gear carrier but special balancing and transmitting elements are required, which add to the expenditure. If the planet gears are mounted on eccentric pins, the bearings must be accommodated within the planet gears and the use of anti-friction bearings will reduce the carrying capacity owing to the point load on the inner race. Besides, this mounting of the planet gears cannot be used in transmissions having small planet gears.

It is an object of the invention to provide for a balance of the tooth pressures particularly in epicyclic transmissions which must have a compact design in the radial directions.

The invention provides an epicyclic spur gear transmission comprising a sun gear, a plurality of planet gears grouped around and in mesh with the sun gear, a ring gear surrounding and in mesh with the planet gears, a planet gear carrier relative to which the sun gear and the ring gear are rotatable, said planet gears being equally angularly spaced and mounted in slots formed in said planet gear carrier, means for generating radially directed components of bearing pressure acting on each of said planet gears, and at least one freely movable ring, which is in positive engagement with a movable bearing element of each of said planet gears under the action of said radially directed components of bearing pressure.

It is another feature of the invention to provide three planet gears spaced 120° apart and having bearing elements surrounded by said freely movable ring.

Finally, it is a feature of the invention that the shafts of the planet gears are guided in radial slots of the planet gear carrier.

Two illustrative embodiments of the epicyclic spur gear transmission are shown in the drawing, in which FIG. 1 is a diagrammatic transverse sectional view showing an epicyclic transmission, in which the planet gears are internally mounted on shafts guided in slightly inclined radial slots of the planet gear carrier.

Figure 1:
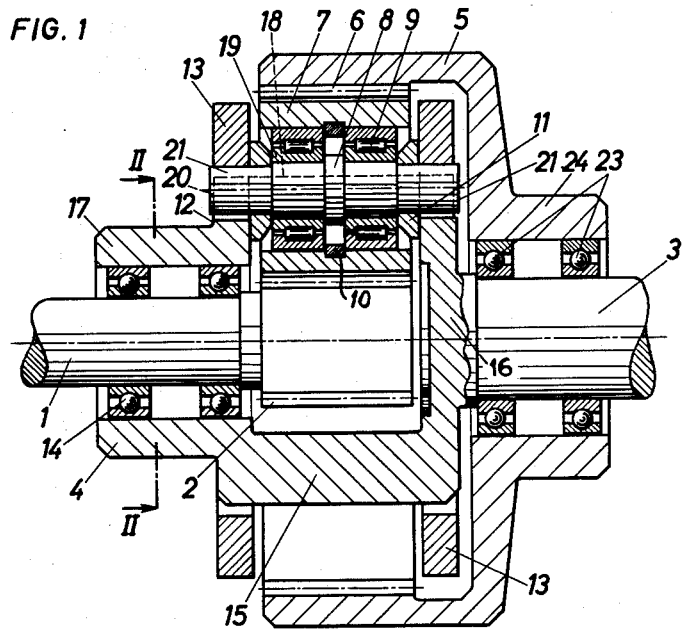
Figure 2:
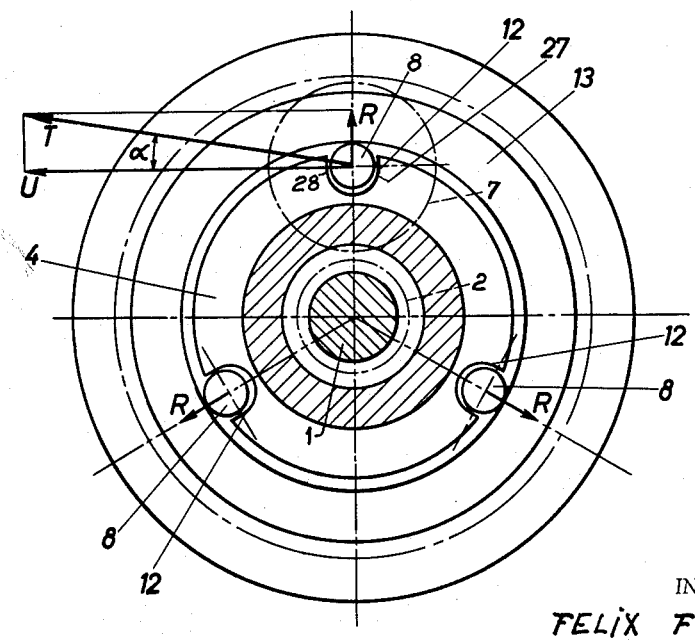
FIG. 2 is an axial view showing such a transmission partly in a section taken on line II—II in FIG. 1.

In the illustrative embodiment shown in FIGS. 1 and 2, numerals 1 and 3 designate the two shafts coupled by the epicyclic spur gear transmission according to the invention. Either of these two shafts may be the input and the other the output shaft, as desired. The shaft 1 carries the sun gear 2, which is in mesh with three planet gears 7, as is shown in FIG. 2, which are spaced 120° apart and are mounted in a planet gear carrier 4. This comprises a cylindrical portion 15, which is closed on all sides and the bottom 16 of which is rigidly connected at its center to the shaft 3. The open end of the cylindrical portion 15 is continued by a hub 17, which is mounted on the shaft 1 by ball bearings 14. The peripheral wall of the cylindrical portion 15 is provided with three radially outwardly extending apertures 18, which are equally spaced apart and through which the planet gears 7 inserted in the planet gear carrier 4 extend outwardly. Within the planet gears 7, e.g., two anti-friction bearings 9 are provided, which are spaced apart by a spacer ring 10 and the inner races 19 of which are shrunk on the planet gear shafts 8, which protrude on both sides from the planet gears 7. Adjacent to each aperture 18 the planet gear carrier 4 has at the outer rim of the bottom 16 and in the wall 20 opposite thereto a radial slot 12, which is open toward the outside and has mutually parallel side faces 27, 28. Each of these slots 12 receives one end portion 21 of the planet gear shafts 8. The slots 12 in each of the two mounting walls 16, 20 of the cylindrical portion 15 of the planet gear carrier 4 are spaced 120° apart, corresponding to the spacing of the planet gears 7. The outside diameter of the cylindrical portion 15 is selected so that the extremities of the end portions 21 of the planet gear shafts 8 mounted in the slots 12 protrude from the latter. At both guided ends, i.e., adjacent to both mounting walls 16, 20, these protruding extremities of the end portions 21 of the planet gear shafts protruding from the slots 12 are surrounded and positively engaged by a ring 13. All three planet gears 7 are in mesh with the ring gear 6 formed in a cylindrical housing 5, which surrounds a major portion of the epicyclic spur gear train and is covered at one end by an annular bottom member 22, which carries a hub 24 carrying the shaft 3 by ball bearings 23. The axial distance from the planet gear 7 to the end walls 16 and 20 of the planet gear carrier 4 and to the rings 13 is determined by spacing discs 11, which are fitted on the end portions 21 of the shafts 8 between the bearings 9 and the rings 13.

To obtain a pressure acting in a radial direction, the profile of the teeth of the ring gear 6 is offset from that of the teeth of the sun gear 2. In practice, this is achieved by a correction of the teeth of the sun gear, which consists of a pinion. As a result, the angle of pressure between the ring gear 6 and a planet gear differs from that between the planet gear and the sun gear and, if frictional loads are disregarded, the guiding force effective under load at the points where the planet gears 7 are mounted, will include an angle $\alpha$ with the tangent applied to the circumferential circle. At any point of the guide, this force T may be resolved into a circumferential force U and a radial force R. The three radial forces R spaced 120° apart must be taken up by the freely movable rings 13 whereas the sum of the circumferential components U equals the torque applied to the planet gears 7. Under the influence of three forces spaced 120° apart, such a freely movable ring can only be balanced if these forces are equal to each other. For this reason, the balancing rings 13 will tend to be moved under the influence of the radially guided planet gears until the radial pressures on all bearing elements are equal so that equal circumferential forces U will also be effective. If frictional influences are disregarded, the radial components of bearing pressure will be proportional to the resulting tooth pressures generating said components. If the radial components of the resulting tooth pressures at the various planet gears are equal, the resulting tooth pressures will also be equalized.

When the radial pressures are generated in this way, the pressures on the shafts will be outwardly directed irrespective of the sense of rotation and of the circumferential direction.

Figure 3:
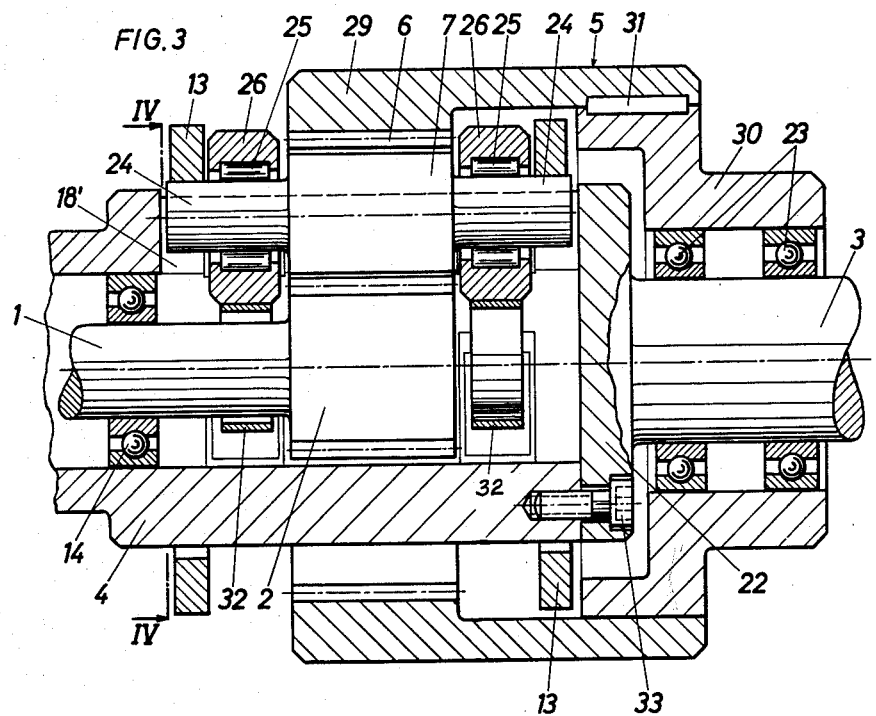
FIG. 3 is a diagrammatic transverse sectional view showing another embodiment of the invention, in which the planet gears are provided on both sides with stub shafts mounted in anti-friction bearings. The outer races of the anti-friction bearings are guided in radial slots of the planet gear carrier.
Figure 4:
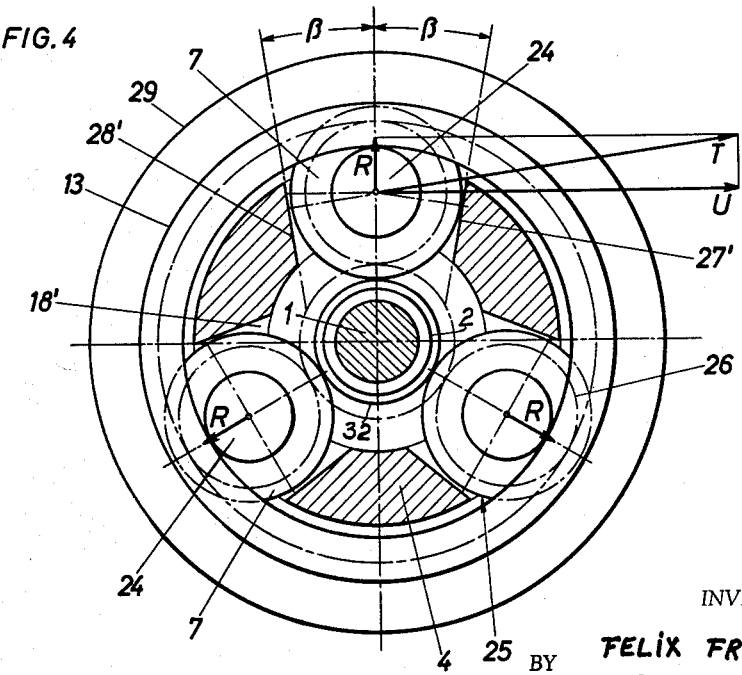
FIG. 4 is an axial view showing a transmission partly in section taken on line IV—IV of FIG. 3.

FIGS. 3 and 4 show a modification of the epicyclic spur gear transmission, in which radially outwardly directed components of pressure are also generated irrespective of the sense of rotation or of the direction of the circumferential forces. This design is similar to the first embodiment in that the planet gear carrier 4 is carried by means of the bearings 14 by the shaft 1 of the sun gear 2. Instead of the cylinder bottom 16, a flange 22 is provided, which is rigidly connected to the carrying shaft 3 and secured by screws 33 to the planet gear carrier 4. The three planet gears 7 consist of pinions small in diameter and are provided each with stub shafts 24 on both ends. Each of these stub shafts is disposed in an anti-friction bearing 25 having no inner race whereas the outer race 26 is guided in a slot 18' of the planet gear carrier 4. The slots 18' correspond to the apertures 18 of the embodiment of FIGS. 1 and 2 but like the former slots 12 serve to guide the planet gears. In this design, the radial component of pressure is due to an inclination of the side faces 27' and 28' of the slots 18' rather than to a correction of the side faces of the teeth. The center lines of all three slots 18' associated with one planet gear 7 each are spaced 120° apart and extend radially, as is shown in FIG. 4. The inwardly converging side faces 27', 28' of the slots 18' extend symmetrically with respect to these center lines and include a small angle $\beta$ therewith. Like the end portions 21 of the planet gear shafts 8 of the preceding embodiment, the extremities of the stub shafts 24 are surrounded and positively engaged by the rings 13. The housing 5 consists of two parts, namely, the cylindrical part 29, which is formed internally with the ring gear 6 in mesh with the planet gears, and the hub part 30 carried by the planet gear carrier shaft 3 by means of ball bearings 23. Keys 31 are provided for transmitting torque between the two housing parts 29 and 30. To avoid a clamping of the planet gear shafts under the action of their own weight, the outer races 26 of the anti-friction bearings 25 bear inwardly on preferably resilient rings 32.

During operation in one direction, a force T directed substantially at right angles to the engaged slot side face, e.g., 27', is transmitted between the planet gear carrier 4 and the outer race 26 of each planet gear 7 (FIG. 4). This force can be resolved into a peripheral component U and a radial component R. The radial components R acting on the three guide points and spaced 120° apart will be taken up by the freely movable rings if these components and the circumferential components U dependent thereon are equal. In this embodiment this load balance will also be obtained when the direction of rotation is reversed because the symmetrically disposed, inclined slot side face 28' is now engaged and also produces a radially outwardly directed component R. To maintain for the planet gears the freedom of movement required to enable their adjustment within the toothed rims and the balancing of loads, the outer races 26 of the anti-friction bearings in normal position do not engage the slot side faces 27', 28' of the planet gear carrier 4 but are slightly spaced from the slot side faces.

It is also within the scope of the invention to provide for a zero side face angle $\beta$ in the embodiment of FIGS. 3 and 4 and to generate the radial component of pressure by offsetting the profile of the teeth of the ring gear or sun gear, as in the embodiment shown in FIGS. 1 and 2.

On the other hand, it is possible in the embodiment of the transmission shown in FIGS. 1 and 2 to produce the radial component of pressure by the inclination of the side faces of the slot 12 rather than by the described off-setting of the profile. In this case, the side faces of the slots may diverge, as is shown in FIGS. 3 and 4, or be mutually parallel. In the latter case, each slot is defined by two mutually parallel side faces, which are slightly inclined with respect to the radial direction so that the guide pressure extending approximately at right angles to the slot side face will produce at each shaft guide a radial component, which will be taken up by the ring positively engaged by the three shafts and will be balanced with the radial components effective at the other shaft guides. When the radial pressure is produced in that way, the shaft pressures will be outwardly directed only in one sense of rotation or circumferential direction and will be reversed in the case of a reversion of the sense of rotation or circumferential direction. When such transmissions are to be used for both senses of rotation and circumferential directions, outer races as well as inner races will have to be provided.

What is claimed is:

1. An epicyclic spur gear transmission comprising a sun gear, a plurality of planet gears grouped around in mesh with the sun gear, a ring gear surrounding and in mesh with the planet gears, an axially fixed cylindrical planet gear carrier relative to which the sun gear and the ring gear are rotatable and having equally angularly spaced slots formed in the peripheral wall thereof, said planet gears being mounted in said slots of the planet gear carrier and having bearing elements, means for generating radially outwardly directed components of bearing pressure acting on each of said planet gears, and at least one freely movable ring in surrounding engagement with said bearing elements of said planet gears under pressure of said radially outwardly directed components of bearing pressure.

2. A transmission as set forth in claim 1, wherein there are three planet gears spaced 120 apart.

3. A transmission as set forth in claim 1, wherein said planet gears are provided with shafts, and additional radial slots are provided in the end walls of said planet gear carrier, said shafts of the planet gears being guided in said additional radial slots.

References Cited by the Examiner
UNITED STATES PATENTS

| | | | |
|---|---|---|---|
| 1,370,080 | 3/21 | Ahond | 74—796 |
| 2,150,540 | 3/39 | Chilton | 74—801 |
| 2,944,444 | 7/60 | Burns | 74—801 |
| 3,008,355 | 11/61 | Grudin | 74—801 |

DON A. WAITE, *Primary Examiner.*